United States Patent Office 3,803,289
Patented Apr. 9, 1974

3,803,289
PROCESS FOR THE CONTINUOUS WORKING UP OF A DILUTE AQUEOUS ALUMINUM FLUORIDE SOLUTION
Alfred Schmidt, Linz (Danube), Austria, assignor to Osterreichische Stickstoffwerke Aktiengesellschaft, Linz (Danube), Austria
No Drawing. Filed July 3, 1972, Ser. No. 268,876
Claims priority, application Austria, July 7, 1971,
A 5,872/71
Int. Cl. C01f 7/50
U.S. Cl. 423—123          5 Claims

ABSTRACT OF THE DISCLOSURE

Dilute aqueous aluminium fluoride solution containing a maximum of 1% by weight of aluminium and containing aluminium silicofluoride and/or fluosilicic acid are worked up by feeding the solution continuously or batchwise to a continuously operating vacuum crystallizer from which simultaneously a corresponding amount of crystal suspension is removed, the vacuum crystallizer being maintained at a concentration of $SiF_6$ ion in the solution contained in the crystallizer of 12 to 14% by weight, at a temperature of 70° to 75° C. and a pressure of 0.3 to 0.4 atmosphere absolute.

---

This invention relates to a process for the continuous working up of dilute aqueous aluminium fluoride solutions.

When crystallizing aluminium fluoride trihydrate from aqueous solutions, a mother liquor is left which contains 0.5 to 1.0% by weight of aluminium, depending on the crystallization conditions. The utilization of these mother liquors is an economic necessity since on the one hand, if they are discarded, they contaminate effluents, whilst on the other hand the loss of the aluminium fluoride dissolved therein is unduly expensive.

It is conceivable to isolate aluminium fluoride, still contained therein, by evaporation. Evaporation at atmospheric pressure at the usual crystallization temperature of aluminium fluoride trihydrate, of above 90° C., runs up against the corrosive nature of the solutions to be evaporated, which manifests itself more strongly if the solution originates from a reaction of $Al(OH)_3$ with fluosilicic acid, especially if the acid was used in excess in order to accelerate the crystallization by setitng up a desired content of aluminium silicofluoride.

If the concentration is carried out in vacuo it is possible to reduce the boiling point to 30° to 40° C. this being a temperature which would be preferable in view of the problem about the constructional material. At this temperature, however, the crystallization of aluminium fluoride takes place so slowly that very long residence times and, in continuous operation, apparatus having a very large volume, are required. This makes continuous working up of the mother liquor by evaporation and crystallization economically unacceptable.

It has now been discovered that a continuous vacuum crystallization may be carried out with acceptable dimensions of the apparatus and using fairly cheap constructional materials, such as rubber-covered materials or plastics materials, and that thereby over 80% by weight of the aluminium present in the solution may be isolated, if a temperature of 70° to 75° C. and a reduced pressure of 0.3 to 0.4 atmosphere absolute are established in the vacuum crystallizer and the concentration of $SiF_6$ ion in the concentrated solution is maintained at 12 to 14% by weight. With this procedure, surprisingly, perfect crystallization takes place despite the relatively low temperature. The solutions which remain after removing the crystals show no tendency to deposit aluminium fluoride trihydrate, that is to say the crystallization is practically complete in the continuous procedure. This is particularly surprising since hitherto the view prevailed that aluminium fluoride can hardly be crystallized continuously.

Accordingly, the present invention provides a process for the continuous working up of a dilute aqueous solution of aluminium fluoride having a maximum aluminium concentration of 1% by weight and containing $SiF_6$ ions, which process comprises evaporating the solution continuously or batchwise at a temperature of 70 to 75° C. and a pressure of 0.3 to 0.4 atmospheres absolute, the $SiF_6$ ion concentration in the solution being maintained at 12 to 14% by weight and simultaneously removing the corresponding amount of precipitated aluminium-fluoride-trihydrate.

The crystals thereby obtained are relatively pure provided the solutions being worked up are not excessively contaminated. It is advisable to mount a small column on the crystallizer and to scrub the vapors which escape with the solution introduced. This signifiicantly reduces the losses of fluorine caused by the volatility of the fluosilicic acid produced by hydrolysis. At the beginning of the evaporation process it is advisable to add a small amount of seeding crystals in order to ensure rapid start of the crystallization.

The performance of the process according to the invention is described in more detail in the example which follows.

EXAMPLE

A mother liquor was evaporated in an apparatus consisting of a 2 litre round flask with stirrer and tube for syphoning off, a short column (diameter 35 mm. packing height 400 mm., Raschig rings 4 to 5 mm.), a condensor and a vacuum receiver. This solution was derived from the crystallization of an aluminium fluoride solution which in turn had been manufactured from fluosilicic acid and aluminium hydroxide and which contained 6 g./l. of aluminium and 17 g./l. of fluorine (that is to say 1.83% of $AlF_3$ and 0.56% of $SiF_6''$). The solution was continuously introduced in an amount of 1 litre/hour and the level in the flask was kept constant. The pressure in the apparatus was set to 0.35 amosphere absolute by means of a vacuum regulator and the boiling point in the flask was 73° C.

The experiment was operated over a period of 10 hours for each of 6 days and the analyses of the filtered final liquors are given in Table 1. At the beginning of the experiment, 1 litre of fluosilicic acid (12% of $H_2SiF_6$) and 100 g. of $AlF_3 \cdot 3H_2O$ were first introduced into the flask.

Yield:

|  | Percent by weight of— | |
|---|---|---|
|  | Al in the solution | $SiF_6''$ in the solution |
| 1st day | 2.09 | 12.3 |
| 2d day | 1.99 | 12.1 |
| 3d day | 1.81 | 12.7 |
| 4th day | 2.36 | 11.2 |
| 5th day | 2.80 | 10.6 |
| 6th day | 2.00 | 12.2 |

50 litres of mother liquor were employed within the indicated time and 1.24 kg. of aluminium fluoride trihydrate were obtained as a product—minus the 100 g. of trihydrate introduced as a seeding agent. This corresponds to a yield, in round terms, of 82.5% of the aluminium fluoride employed in the mother liquor.

The variations in the aluminium content of the evaporated and filtered solution thus lie within narrow limits, that is to say the crystallization of the aluminium fluoride trihydrate took place uniformly. After its calcination at 600° C. the trihydrate obtained contained 1 to 1.3% of $SiO_2$ and was thus relatively pure.

What we claim is:

1. A process for the continuous working up of a dilute aqueous solution of aluminum fluoride having an effective amount of aluminum therein in a concentration up to 1% by weight and containing $SiF_6$ ions, which process comprises evaporating the solution continuously or batchwise at a temperature of 70 to 75° C. and a pressure of 0.3 to 0.4 atmosphere absolute, the $SiF_6$ ion concentration in the solution being maintained at 12 to 14% by weight and simultaneously removing the corresponding amount of precipitated aluminium - fluoride - trihydrate thus-produced.

2. The process according to claim 1, in which the dilute aqueous aluminum fluoride solution is a mother liquor from the crystallization of aluminum fluoride after the reaction of aluminum hydroxide with fluosilicic acid.

3. The process according to claim 1, in which a small amount of aluminum fluoride-trihydrate seeding crystals are added to the solution at the beginning of the evaporation.

4. A process for the continuous working up of a dilute aqueous solution of aluminum fluoride which solution is the mother liquor produced from the crystallization of aluminum fluoride as a result of the reaction of aluminum hydroxide with fluosilicic acid, the solution having an aluminum content of 0.5 to 1% by weight and containing $SiF_6$ ions, which process comprises evaporating the solution continuously or batchwise at a temperature of 70° to 75° C. and a pressure of 0.3 to 0.4 atmosphere absolute, the $SiF_6$ ion concentration being maintained at 12 to 14% by weight and simultaneously removing the corresponding amount of aluminum trihydrate thus-produced.

5. The process according to claim 4, in which a small amount of aluminum fluoride-trihydrate seeding crystals is added to the solution at the beginning of the evaporation.

References Cited

UNITED STATES PATENTS 3,175,882    3/1965    Derr _____ 423—126 X

FOREIGN PATENTS 849,010    9/1960    Great Britain _____ 423—489
269,661    2/1964    Australia _____ 423—489

EDWARD STERN, Primary Examiner

U.S. Cl. X.R.

423—489; 23—301